F. SKEEL.
PANEL BOARD.
APPLICATION FILED SEPT. 22, 1911.

1,170,566.                                    Patented Feb. 8, 1916.

WITNESSES:                                    INVENTOR.
                                              Frederick F. Skeel
                                              by Parsons Hall Bodell
                                                        ATTORNEYS.

UNITED STATES PATENT OFFICE.

FREDERICK F. SKEEL, OF CHICAGO, ILLINOIS, ASSIGNOR TO CROUSE-HINDS COMPANY, OF SYRACUSE, NEW YORK, A CORPORATION OF NEW YORK.

PANEL-BOARD.

1,170,566.  Specification of Letters Patent.  Patented Feb. 8, 1916.

Application filed September 22, 1911. Serial No. 350,683.

*To all whom it may concern:*

Be it known that I, FREDERICK F. SKEEL, of Chicago, in the county of Cook and State of Illinois, have invented a certain new and useful Panel-Board, of which the following is a specification.

This invention relates to panel boards designed to be connected in three wire systems and has for its object means whereby the legs of the load circuit can be readily connected either to the outside mains in a two wire system or to one of the outside mains and to the neutral main in a three wire system; and the invention consists in the combinations and constructions hereinafter set forth and claimed.

In describing this invention reference is had to the accompanying drawing in which like characters designate corresponding parts in all the views.

Figure 1:
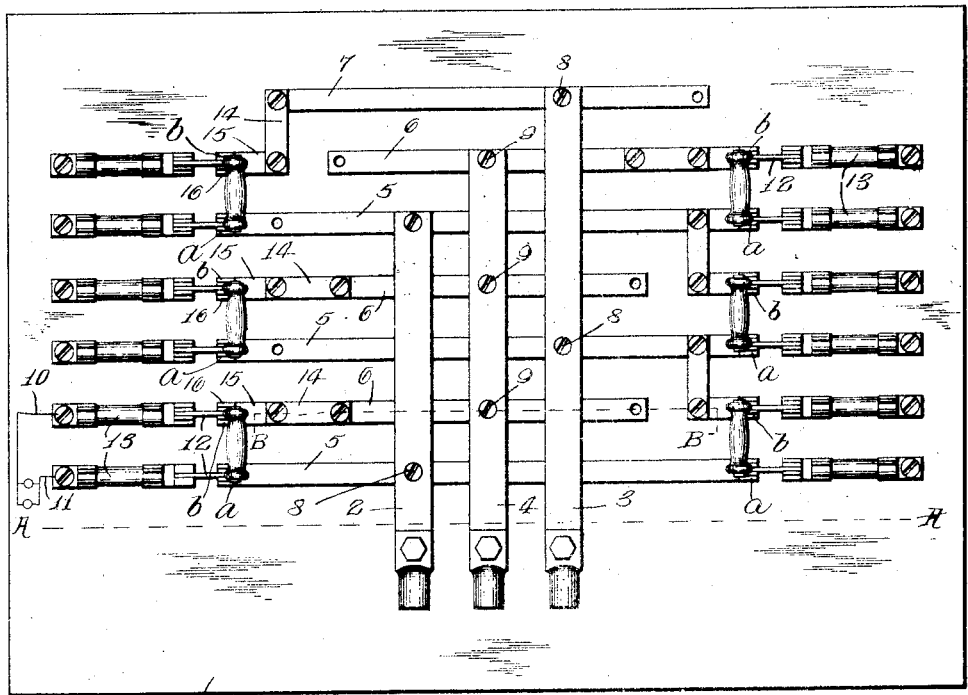
Figure 2:
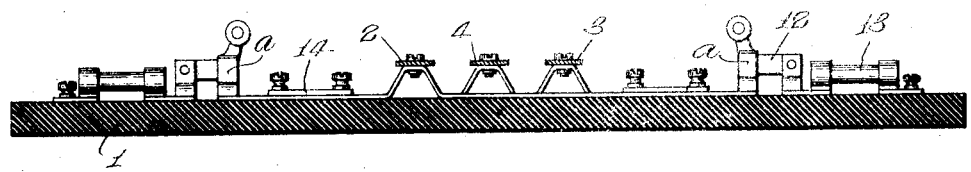
Figure 3:
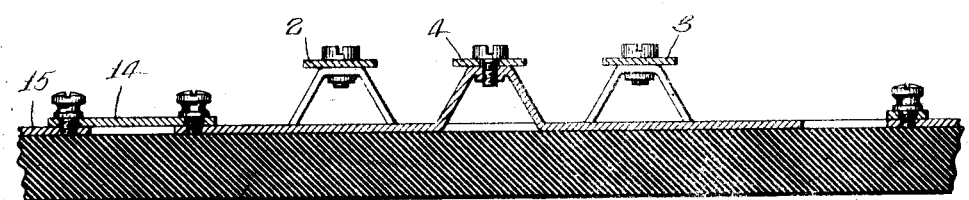

Figure 1 is a plan of a panel board containing one embodiment of my invention. Fig. 2 is a sectional view on line "A—A" Fig. 1. Fig. 3 is an enlarged sectional view on line "B—B", Fig. 1.

This panel board comprises bus bars supported on the base and designed to be connected respectively to the outside mains and the neutral main of a three wire system of electrical distribution, three conducting bars connected respectively to the outside mains and the neutral main and designed to be connected in a load circuit, one leg of which load circuit is connected to the conducting bar connected to one of the outside main bus bars, and the other leg of which load circuit is connected either to the conducting bar connected to the neutral bus bar or to the conducting bar which is connected to the other main bus bar, and means for connecting such other leg of the load circuit to either of the two last-mentioned conducting bars.

1 is the base.

2 and 3 are, respectively, bus bars designed to be connected to the outside mains of a three wire system, and 4 is the neutral bus bar designed to be connected to the third wire of such system.

5, 6 and 7 are conducting bars mounted on the base and extending transversely of the bus bars 2, 3 and 4 and connected respectively to said bus bars.

In the illustrated embodiment of my invention a plurality of sets of conducting bars are shown, and in all of the sets with the exception of the last set, the function of the conducting bar 7 is performed by the bar 5 of the next adjacent set. The conducting bar 5 of each set is connected at 8 to the outside main bus bar 2 or 3 and each of the conducting bars 6 is connected to the neutral bus bar at 9. The bars 5, 6 are connected to the legs 10, 11 of a load circuit through switches 12 and fuses 13 mounted on the panel board in the load circuit in the ordinary manner.

This invention lies primarily in means for connecting one leg of each load circuit either to a conducting bar 5 or to that conducting bar of the next set which is connected to the outside bus bar opposite to the outside bus bar to which the other leg of said load circuit is connected. For facilitating such connection the conducting bars 5, 6 of adjacent sets are arranged in reverse order, that is the bar 5 of the first set is connected to the bus bar 2 while the bar 5 of the next set lies next to the bar 6 of the first set and is connected to the opposite outside bus bar 3.

The means for connecting one leg, as the leg 10 of each load circuit to either the conducting bar 6 of one circuit or to the bar 5 of the next circuit or to the bar 7 of the last circuit, comprises a switch bar 14 connected to a conducting bar 15 on the panel board and arranged to be brought into alinement with the bar 6 or disconnected from such bar 6 and swung at an angle thereto and connected to the bar 5 of the next set.

In case it is desired to connect the bar 6 of the next to the last set to the outside bus bars, a switch bar 14 is connected with the bar 7. Each bar 15 may be any suitable conductor on the base and is here shown as carrying the switch contact terminal 16 of the contiguous switch 12. A similar terminal 16 is mounted on the outer end of each conducting bar 5. These terminals 16 are referred to in the claims as load circuit terminals.

This panel board is particularly advantageous in that any of the load circuits connected thereto can be arranged, when desirable, either in a three wire or a two wire system.

What I claim is:

1. In a panel-board, a base, three bus-bars supported thereon, and connected respectively, to the outside and neutral wires of a three-wire system, a load circuit, a pair of load circuit terminals, a conductor in permanent electrical connection with one of said outside bus-bars, and one terminal of said pair of terminals, a conductor leading from each of the other bus-bars, and means for establishing electrical connection between the other of said pair of terminals, and either of the last two conductors, substantially as and for the purpose described.

2. In a panel-board, a base, three bus-bars supported thereon and connected respectively to the outside and neutral wires of a three-wire system, a plurality of pairs of load circuit terminals, a conductor in permanent electrical connection with one member of each pair of terminals and with one or the other of the outside bus-bars, a conductor for each load circuit leading from the neutral bus-bar, and means for establishing electrical connection between each of the remaining load circuit terminals and the conductor of its load circuit leading from the neutral bus-bar, or the conductor permanently connected to the terminal of the adjacent load circuit, substantially as and for the purpose specified.

3. A panel board comprising a base, three bus bars supported on the base and designed to be connected respectively with the outside mains and the neutral main of a three wire system, three conducting bars mounted on the base and extending crosswise of the bus bars substantially parallel to each other, the conducting bars being connected respectively to the bus bars, load circuit terminals on the base and arranged for normal connection with two of such conducting bars, and means on the panel board for disconnecting one terminal from the conducting bar to which said terminal is connected and connecting such terminal to another conducting bar, said means comprising a bar section normally alined with one of such conducting bars and movable from its normal position about one of its ends as an axis into connection with another conducting bar, substantially as and for the purpose set forth.

4. In a panel-board, a base, three bus-bars supported thereon and connected, respectively, to the outside and neutral wires of a three-wire system, two load circuits, a pair of terminals associated with each circuit and supported on the base, a permanent conductor extending between one outside bus-bar and one terminal of one pair, a second permanent conductor extending between the other outside bus-bar and one of the terminals of the other pair, a conductor for each load circuit leading from the neutral bar, and means associated with the other terminal of the first-named pair for establishing electrical connection between the same and either the conductor associated therewith and leading from the neutral bus-bar, or said second permanent conductor, substantially as and for the purpose described.

5. In a panel board, a base, a plurality of pairs of load circuit terminals at opposite sides thereof, three bus bars extending lengthwise of the base and located between said sets of terminals at opposite sides of the base, said bars being the outside mains and neutral members of the three-wire system, a plurality of pairs of conductor bars extending crosswise of the bus bars, one of the conductor bars of each pair being connected to one outside bus bar and at each end to one terminal of a pair of terminals, alternate conductor bars which are connected at their ends to terminals on opposite sides of the bars being connected to different outside bus bars, and the other conductor of each pair being connected to the neutral bar, and means for connecting each end of each of the latter conductor bars to each of the other terminals of said pairs of terminals or for connecting the last-mentioned terminals to one of the conductor bars of each pair connected to one of the outside bus bars, substantially as and for the purpose specified.

6. A panel board comprising a base, three bus bars supported on the base and designed to be connected respectively with the outside mains and the neutral main of a three wire system, three conducting bars mounted on the base and connected, respectively, to the bus bars and designed to be connected in a load circuit, one leg of which load circuit is connected to the conducting bar connected to one of the outside main bus bars and the other leg of which load circuit is connected either to the conducting bar connected to the neutral bus bar or to the conducting bar connected to the other outside bus bar, and means associated with the panel board for connecting such other leg of the load circuit to either of the two last-mentioned conducting bars, substantially as and for the purpose described.

7. A panel board comprising a base, bus bars supported on the base and designed to be connected respectively with the outside mains and the neutral main of a three wire system, three conducting bars mounted on the base and extending transversely of the bus bars, the conducting bars being connected respectively to the bus bars and designed to be connected in a load circuit, one leg of which load circuit is connected to the conducting bar connected to one of the outside bus bars and the other leg of which load circuit is connected either to the conducting bar connected to the neutral bus bar or to the conducting bar connected to the other outside bus bar, and a movable switch for connecting such other leg of the load circuit to either of the two last-mentioned conducting bars, substantially as and for the purpose specified.

8. A panel board comprising a base, bus bars supported on the base and designed to be connected respectively with the outside mains and the neutral main of a three wire system, three conducting bars mounted on the base and extending transversely of the bus bars, the conducting bars being connected respectively to the bus bars and designed to be connected in a load circuit, one leg of which load circuit is connected to the conducting bar connected to one of the outside bus bars and the other leg of which load circuit is connected either to the conducting bar connected to the neutral bus bar or to the conducting bar connected to the other outside bus bar, and a movable switch for connecting such other leg of the load circuit to either of the two last-mentioned conducting bars, such switch comprising a bar arranged to be brought into alinement with the conducting bar connected to the neutral bus bar and movable into a position at an angle to the conducting bar connected to the neutral bus bar, into connection with the conducting bar connected to such other outside bus bar, substantially as and for the purpose set forth.

9. A panel board comprising a base, bus bars supported on the base and designed to be connected respectively to the outside mains and the neutral main of a three wire system, a plurality of sets of conducting bars, the conducting bars of one set being connected respectively to one of the outside bus bars and to the neutral bus bar, and those of the next adjacent set being connected to the other outside bus bar and to the neutral bus bar, the conducting bars of each set being designed to be connected respectively to the legs of a load circuit, and a switch for connecting the leg of the load circuit connected to the conducting bar of one set to one of the conducting bars of the next set, substantially as and for the purpose described.

10. A panel board comprising a base, bus bars supported on the base and designed to be connected respectively to the outside mains and the neutral main of a three wire system, a plurality of sets of conducting bars, the conducting bars of one set being connected to one of the outside bus bars and to the neutral bus bar, and those of the next adjacent set being connected to the other outside main bus bar and to the neutral bus bar, the conducting bars of each set being designed to be connected respectively to the legs of a load circuit, and means associated with each set of conducting bars for connecting the load circuit leg connected to the conducting bar, which is normally connected to the neutral bus bar, to the conducting bar of the next set which is connected to such other outside bus bar, substantially as and for the purpose described.

In testimony whereof, I have hereunto signed my name in the presence of two attesting witnesses, at Syracuse, in the county of Onondaga, in the State of New York, this 21st day of August, 1911.

FREDERICK F. SKEEL.

Witnesses:
WM. CORNELL BLANDING,
C. C. SCHOENECK.